United States Patent [19]
Wakabayashi

[11] Patent Number: 5,174,217
[45] Date of Patent: Dec. 29, 1992

[54] CONVEYOR HAVING SELF-PROPELLED CARRIERS WITH A FIRST MOTOR FOR HIGH SPEED DRIVING AND A SECOND MOTOR FOR LOW SPEED DRIVING

[75] Inventor: Takao Wakabayashi, Osaka, Japan

[73] Assignee: Nakanishi Metal Works Co., Ltd., Osaka, Japan

[21] Appl. No.: 466,792

[22] Filed: Jan. 18, 1990

[30] Foreign Application Priority Data

Jan. 19, 1989 [JP] Japan ............................... 1-11300

[51] Int. Cl.⁵ .......................................... B61C 11/04
[52] U.S. Cl. ............................ 105/29.1; 105/153; 104/93
[58] Field of Search ............... 104/93, 107, 109, 288, 104/295, 165; 105/29.1, 49, 127, 150, 152, 153

[56] References Cited

U.S. PATENT DOCUMENTS

| | | | |
|---|---|---|---|
| 569,097 | 10/1896 | Fryer | 105/29.1 |
| 601,296 | 3/1898 | Wheelock | 105/29.1 |
| 1,704,958 | 3/1929 | Wichert | 105/29.1 |
| 3,033,152 | 5/1962 | Tourneau | 105/29.1 |
| 3,356,040 | 12/1967 | Fonden | 104/166 |
| 3,429,280 | 2/1969 | Dashen et al. | 105/29.1 |
| 3,589,205 | 6/1971 | Radovic | 105/29.1 |
| 3,648,617 | 5/1972 | Metzne et al. | 105/29.1 |
| 3,935,822 | 2/1976 | Kaufmann | 104/93 |
| 4,207,821 | 6/1980 | Becket | 105/29.1 |
| 4,428,298 | 1/1984 | Gutekunst et al. | 104/166 |
| 4,563,956 | 1/1986 | Wiechert et al. | 105/29.1 |
| 4,628,823 | 12/1986 | Mangam et al. | 107/166 |
| 4,823,704 | 4/1989 | Fujita et al. | 105/29.1 |

FOREIGN PATENT DOCUMENTS

52-97573 8/1977 Japan.
52-97575 8/1977 Japan.

*Primary Examiner*—Robert J. Oberleitner
*Assistant Examiner*—S. Joseph Morano
*Attorney, Agent, or Firm*—Armstrong & Kubovcik

[57] ABSTRACT

A conveyor comprising a plurality of self-propelled carriers adapted to run along a rail, the rail having a first drive wheel bearing surface facing upward and a plurality of downward teeth formed at least at a gradient portion of the rail, each of the carriers having a first drive wheel rollable on the wheel bearing surface of the rail, a first electric motor for driving the first drive wheel, a gear meshable with the teeth of the rail and a second electric motor for driving the gear.

1 Claim, 9 Drawing Sheets

CONVEYOR HAVING SELF-PROPELLED CARRIERS WITH A FIRST MOTOR FOR HIGH SPEED DRIVING AND A SECOND MOTOR FOR LOW SPEED DRIVING

BACKGROUND OF THE INVENTION

The present invention relates to a conveyor having self-propelled carriers, for example, for use in motor vehicle production lines.

With motor vehicle production lines, a plurality of carriers having vehicle parts (article to be transported) placed thereon need to be moved through a specified work zone with a constant distance maintained between the carriers. Accordingly, power-and-free trolley conveyors have heretofore been used.

However, the power-and-free trolley conveyor employs chains and therefore has the problem of giving off a great noise and being unable to drive the carriers at a high speed in transport zones or the like other than the work zone.

Accordingly, conveyors having a plurality of self-propelled carriers have been proposed to ensure a reduced noise and to drive the carriers at a higher speed.

The self-propelled carrier of the conventional conveyor of the first-mentioned type has one drive wheel rollable on a rail and one electric motor for driving the wheel.

The conveyor therefore has the problem that when the rail has a gradient, the drive wheel slips at the gradient portion, making the carrier unable to run smoothly.

To overcome this problem, it has been proposed to provide a carrier lift between a high horizontal rail portion and a lower horizontal rail portion without giving the gradient to the rail, or to provide a chain conveyor for the gradient portion to move the carrier with the chain (see Unexamined Japanese Patent Publication SHO 52-97573). However, the lift or chain conveyor needed results in an increased equipment cost.

A conveyor is also proposed wherein a rack having upward teeth is provided at a rail gradient portion, and a pinion mounted on the same shaft as the drive wheel of a carrier is adapted to roll on the rack at the gradient portion (see Examined Japanese Patent Publication SHO 52-97575). However, this arrangement has a problem in respect of strength since a load acts on the pinion at the shaft end of the drive wheel. Further because the pinion as positioned on the rack is subjected to the load of the carrier, the pinion fails to mesh with the rack smoothly, while these members undergo marked abrasion.

Further in the case where the carrier is adapted to run selectively at a high speed or a low speed, the single motor conventionally used for driving the drive wheel encounters the problem of an insufficient torque when driving the carrier at the low speed.

SUMMARY OF THE INVENTION

An object of the present invention is to provide a conveyor comprising self-propelled carriers which are adapted to run along rail gradient portions without slipping.

Another object of the invention is to provide a conveyor comprising self-propelled carriers each having a gear which is meshable with toothed portions smoothly with diminished wear.

Still another object of the invention is to provide a conveyor comprising self-propelled carriers which is free of the likelihood that the drive torque will become insufficient during running at a low speed.

More specifically, the present invention provides a conveyor comprising a plurality of selfpropelled carriers adapted to run along a rail, the rail having a first drive wheel bearing surface facing upward and a plurality of downward teeth formed at least at a gradient portion of the rail, each of the carriers having a first drive wheel rollable on the wheel bearing surface of the rail, a first electric motor for driving the first drive wheel, a gear meshable with the teeth of the rail and a second electric motor for driving the gear.

The rail may be formed at a required portion with a friction roller bearing surface facing downward. In this case, each of the carriers has a friction roller positionable in pressing contact with the roller bearing surface from below and rotatable by the second electric motor.

At the horizontal portion of the running rail, the carrier is allowed to run at a high speed by driving the first drive wheel by the first electric motor. At the gradient portion, the gear is driven by the second electric motor in meshing engagement with the teeth of the rail, whereby the carrier can be caused to run at a low speed. This precludes the carrier from slipping at the gradient portion without the need to additionally provide a lift or chain conveyor, hence a reduced equipment cost. During running at the low speed, the gear meshes with the downward teeth of the running rail, with the first drive wheel bearing the weight of the carrier, so that the gear is smoothly meshable with the teeth with diminished wear.

In the case where the rail has the friction roller bearing surface, and the carrier has the friction roller adapted for pressing contact with this surface, the carrier can be caused to run by the friction roller during running at the low speed. This eliminates the likelihood of the drive torque becoming insufficient.

DESCRIPTION OF THE PREFERRED EMBODIMENT

Figure 1:
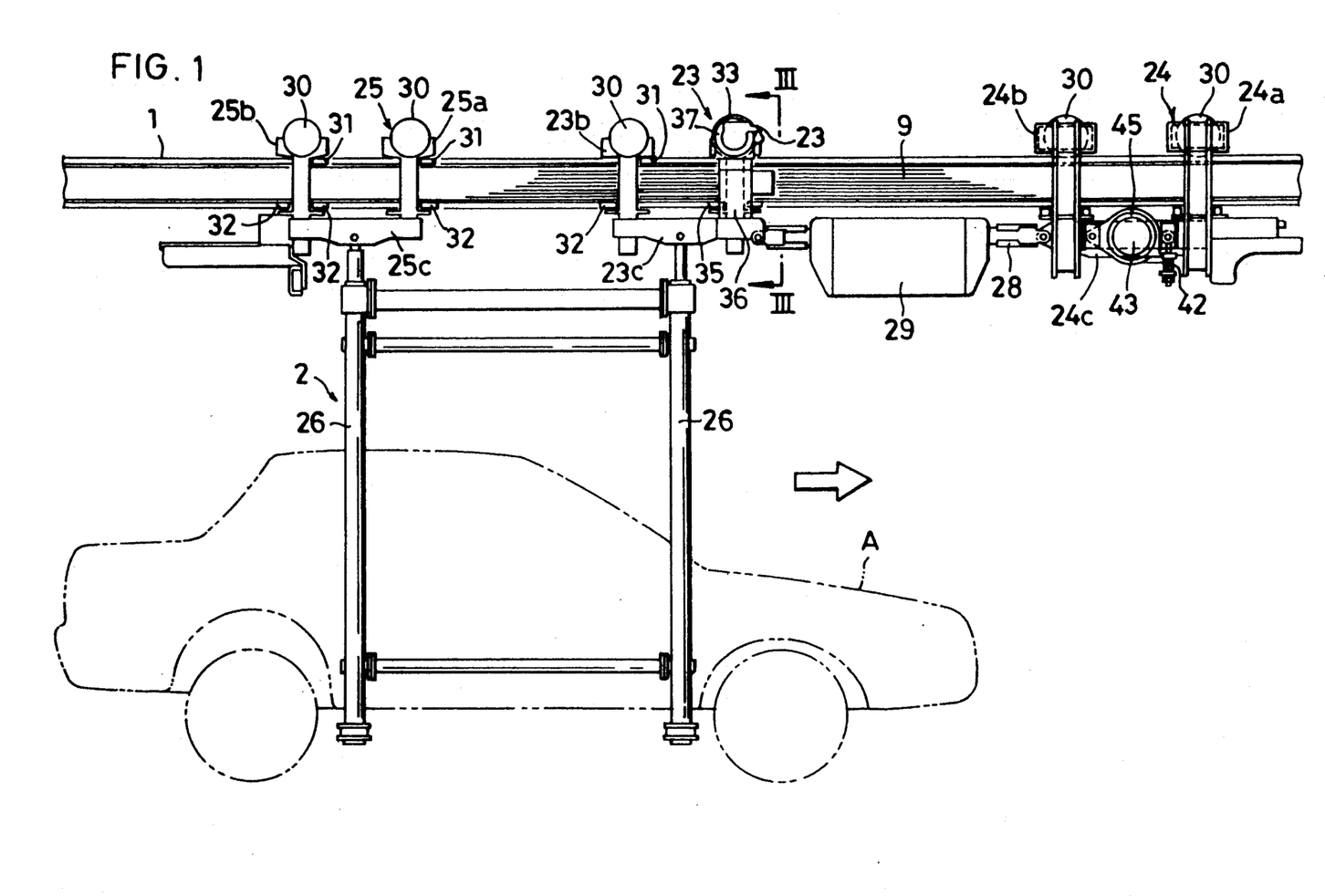
FIG. 1 is a side elevation showing the running rail and self-propelled carrier of a conveyor embodying the invention.
Figure 2:
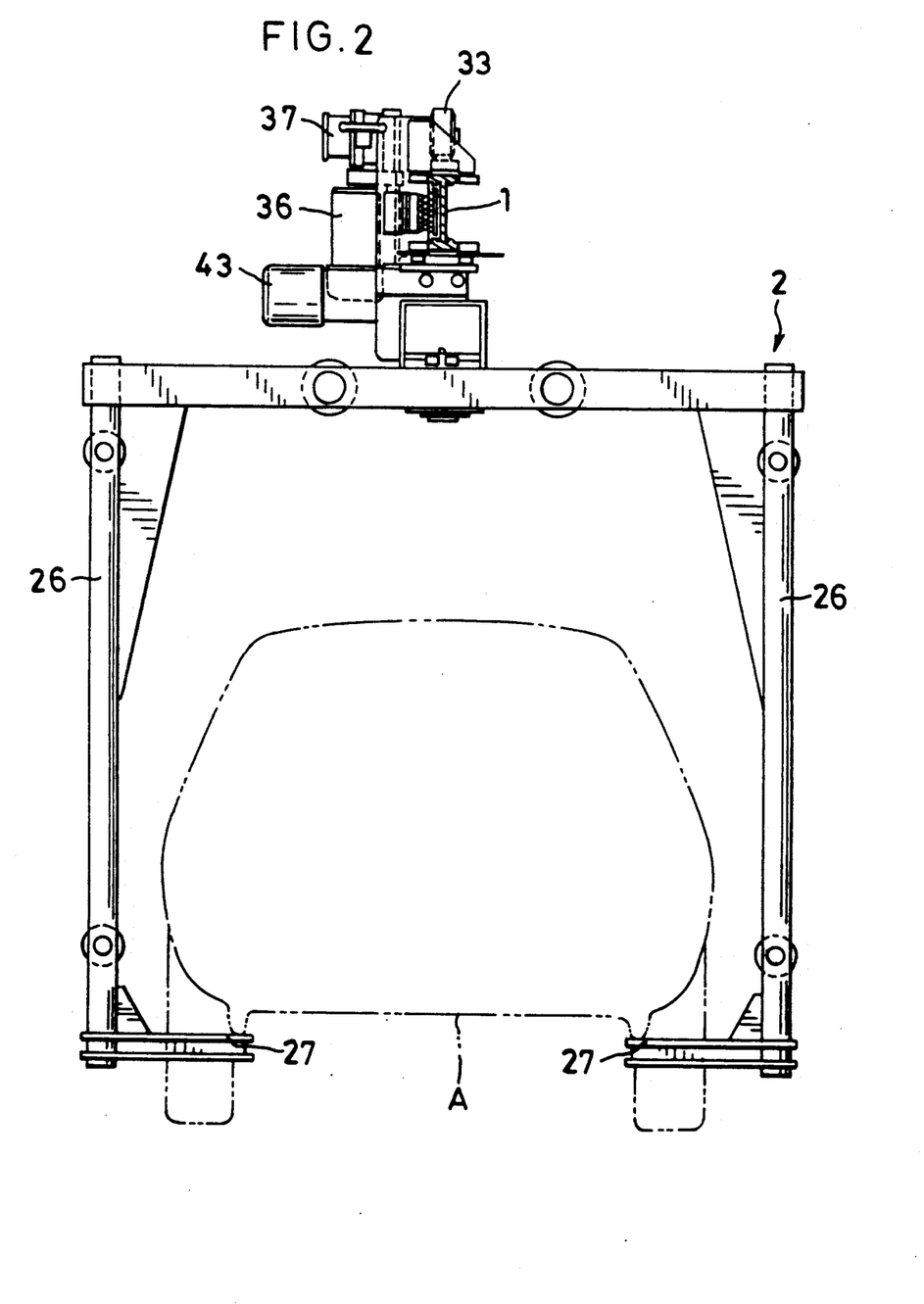
FIG. 2 is a front view of the same.

FIGS. 1 and 2 show an example of running rail 1 of a conveyor provided for a motor vehicle production line and an example of self-propelled carrier 2 thereof. FIGS. 3 to 15 show the same in detail. FIG. 16 is a fragmentary view showing the running rail 1. In these drawings, the direction of advance of the carrier 2 is indicated by arrows. In the following description, the terms "front," "rear," "right" and "left" are used with respect to the direction of advance of the carrier 2.

With reference to FIG. 16, the running rail 1 has a first high horizontal portion 3, a low horizontal portion 4 ahead thereof, and a second high horizontal portion 5 further ahead of the portion 4. A descent portion 6 is provided at a portion of transit from the first high horizontal portion 3 to the low horizontal portion 4, and an ascent portion 7 as a portion of transit from the low horizontal portion 4 to the second high horizontal portion 5. The high horizontal portion 3 is divided into a high-speed running portion (first high-speed running portion) 3k in the rear, and a low-speed running portion (first low-speed running portion) 3t in the front. The second high horizontal portion 5 is divided into a rearward low-speed running portion (second low-speed running portion) 5t and a forward high-speed running portion (second high-speed running portion) 5k.

Figure 3:
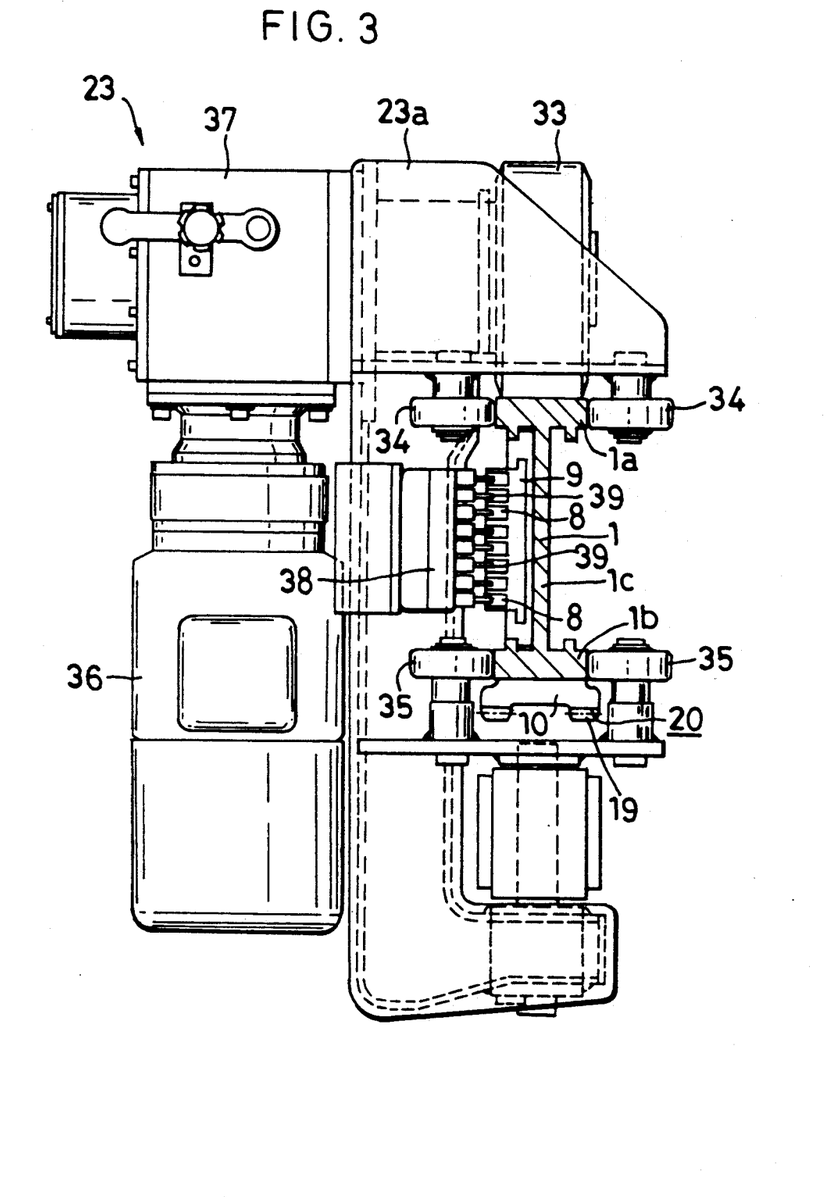
FIG. 3 is an enlarged view in section taken along the line III—III in FIG. 1.
Figure 4:
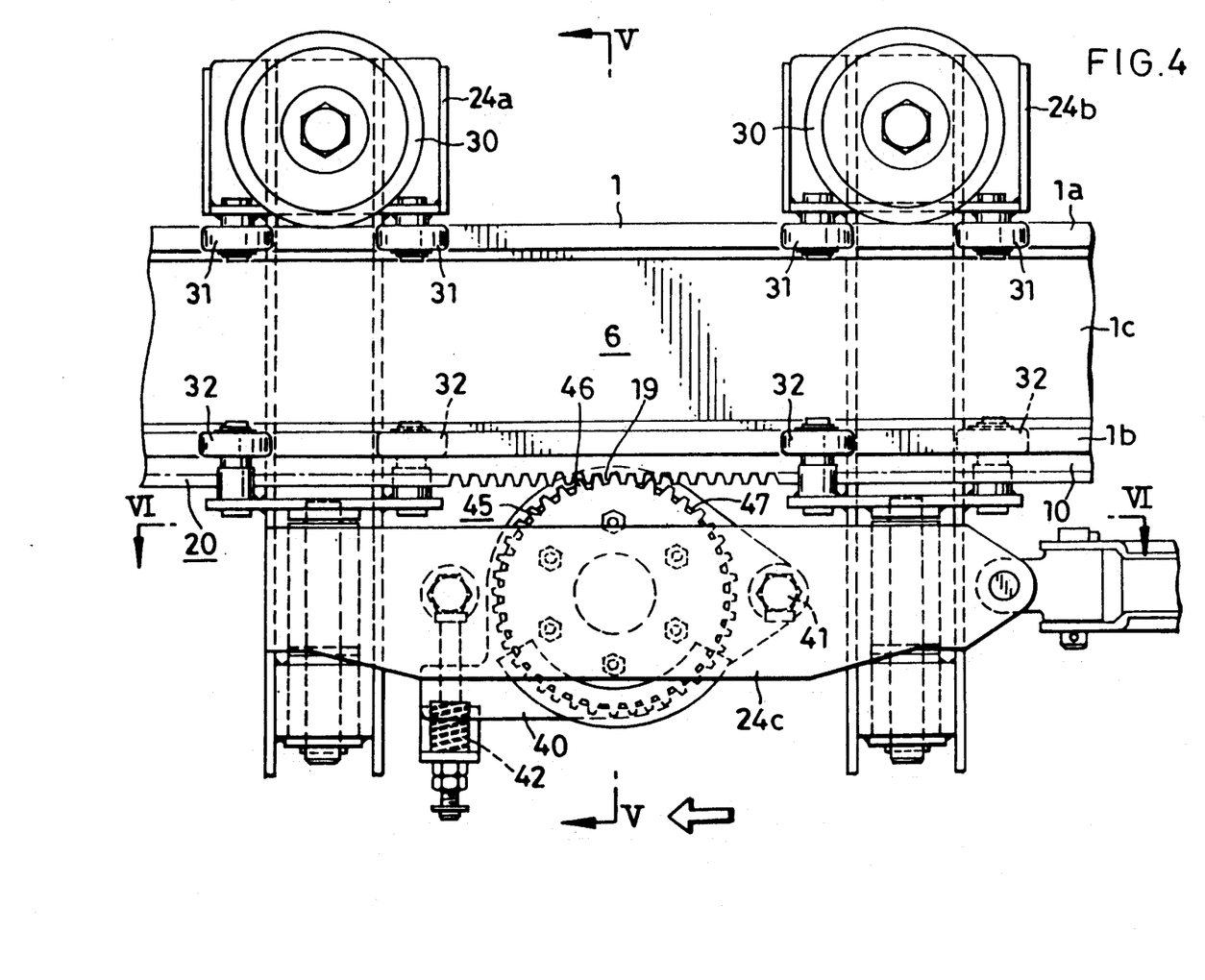
FIG. 4 is an enlarged side elevation of a second drive trolley.
Figure 5:
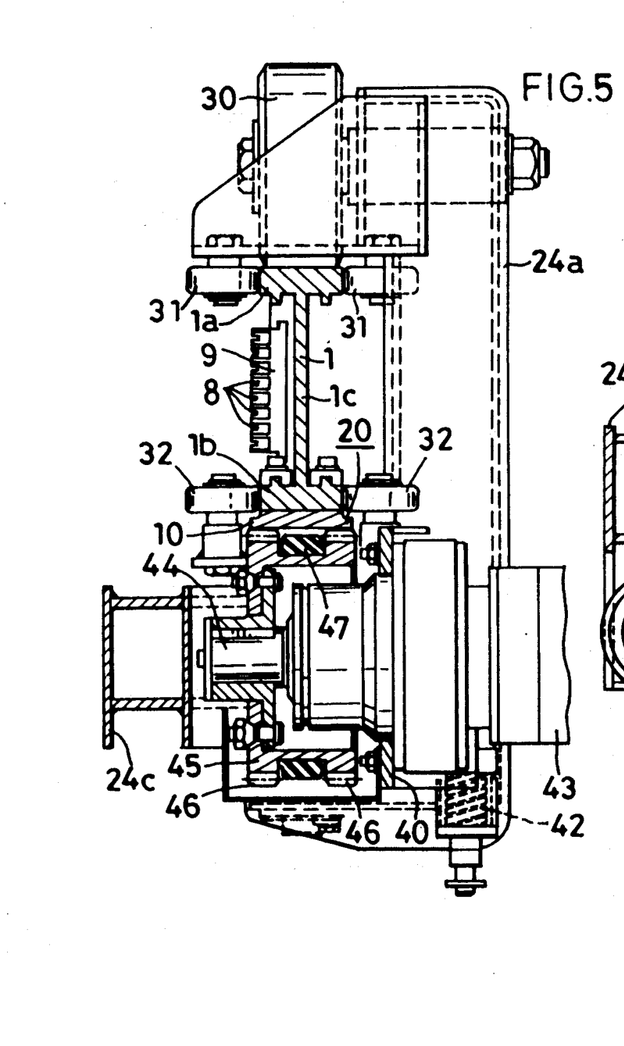
FIG. 5 is a view in section taken along the line V—V in FIG. 4.

As seen in detail in FIGS. 3 to 5, the running rail 1 is I-shaped in cross section and comprises an upper flange 1a, lower flange 1b and web 1c interconnecting the flanges. The running rail 1 is supported at suitable portions by unillustrated support members on the ceiling or the like of a building. On one side of the web 1c of the running rail 1 between the upper and lower flanges 1a, 1b thereof, a power distribution rail 9 is provided which has a plurality of electric wires 8 as arranged one above another.

Figure 7:
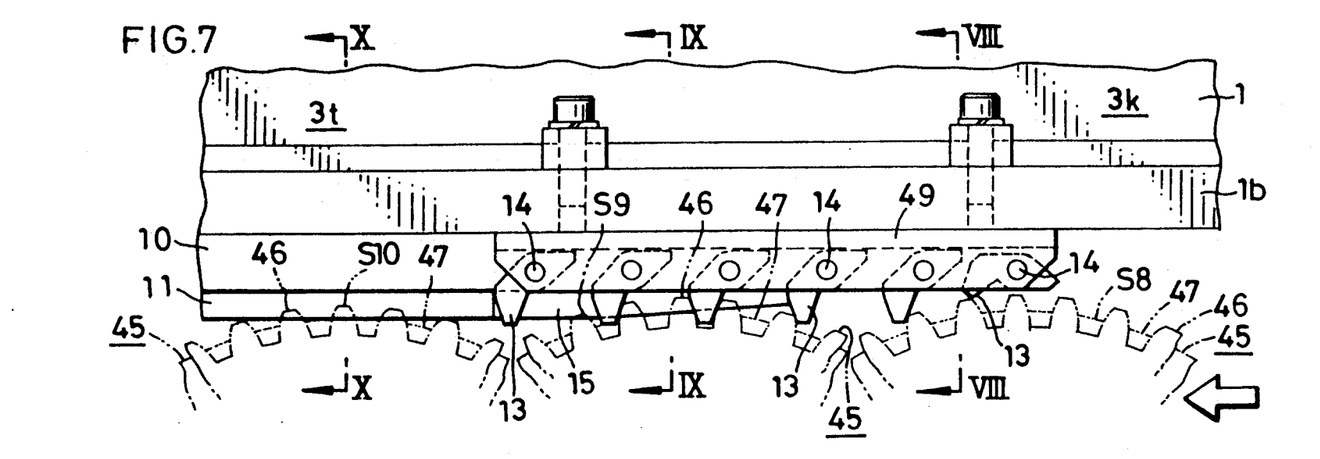
FIG. 7 is an enlarged side elevation of a transit portion of the rail between a first high-speed running portion and a first low-speed running portion.
Figure 11:
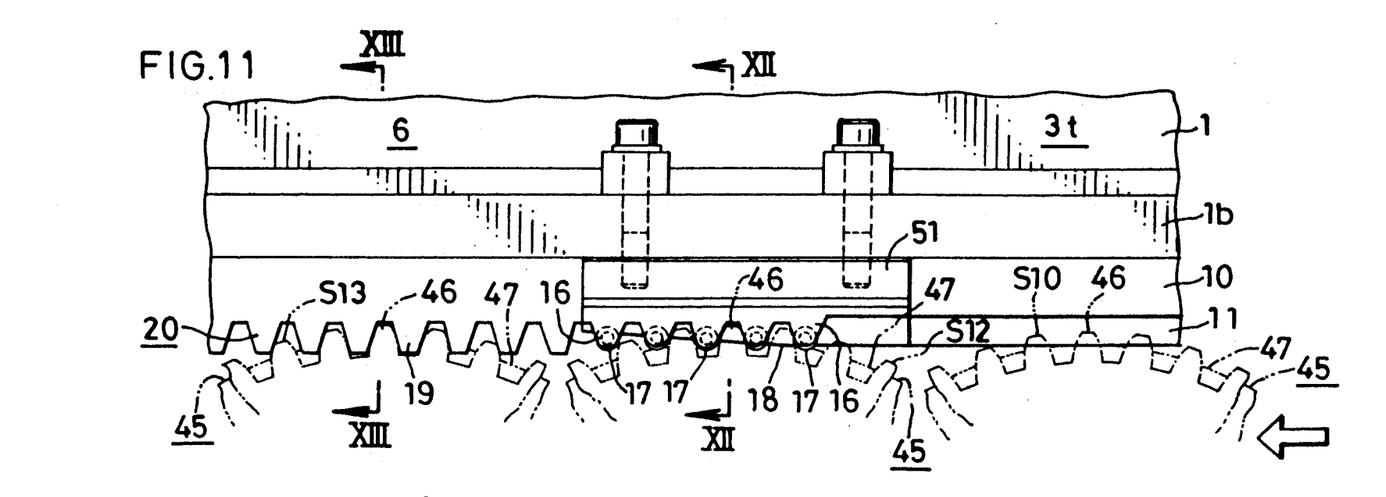
FIG. 11 is an enlarged side elevation showing a portion of transit from the first low-speed running portion of the rail to a descent portion thereof.
Figure 14:
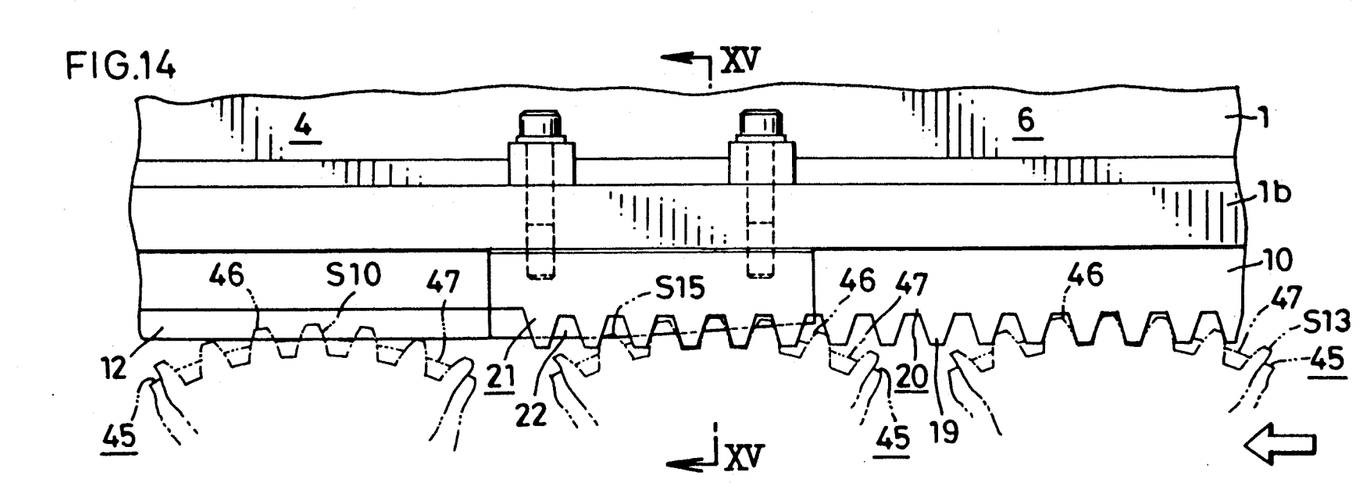
FIG. 14 is an enlarged side elevation showing a portion of transit from the descent portion of the rail to a low horizontal portion thereof.

FIG. 7 shows the portion of transit from the first high-speed running portion 3k of the rail 1 to the first low-speed running portion 3t, FIG. 11 shows the portion of transit from the first low-speed running portion 3t to the descent portion 6, and FIG. 14 shows the portion of transit from the descent portion 6 to the low horizontal portion 4.

As shown in detail in FIGS. 7 to 15, an auxiliary rail 10 is secured to the underside of the lower flange 1b of the running rail 1 in the first low-speed running portion 3t, descent portion 6, low horizontal portion 4, ascent portion 7 and second low-speed running portion 5t. The auxiliary rail 10 has an approximately rectangular cross section which is elongated transversely of the rail 10. The lower surface of the widthwise midportion of the rail 10 is in parallel to the lower surface of the lower flange 1b.

As seen in detail in FIGS. 7 to 12, a friction rail 11 rectangular in cross section is secured to the lower surface of the midportion of the auxiliary rail 10 in the first low-speed running portion 3t. Further as shown in detail in FIGS. 14 and 15, like friction rail 12 is secured to the midportion lower surface of the auxiliary rail 10 at the low horizontal portion 4. As shown schematically in FIG. 16, like friction rail 48 is also secured to the midportion lower surface of the auxiliary rail 10 at the second low-speed running portion 5t. The friction rails 11, 12, 48 have a definite thickness as measured downward from the lower surface of the auxiliary rail 10.

Figure 8:
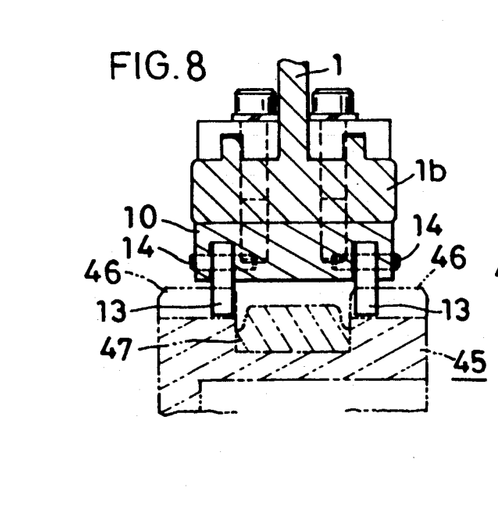
FIG. 8 is a view in section taken along the line XIII—XIII in FIG. 7.
Figure 9:
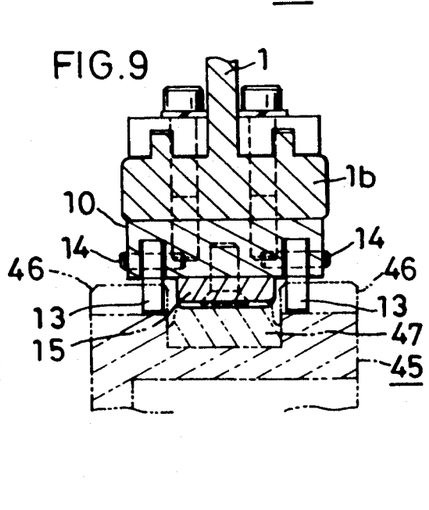
FIG. 9 is a view in section taken along the line IX—IX in FIG. 7.

As shown in detail in FIGS. 7 to 9, the rear end portion of the auxiliary rail 10 at the transit portion between the first high-speed running portion 3k and the first low-speed running portion 3t provides a ratchet pawl portion 49. At the right and left opposite sides of this portion 49, a plurality of ratchet pawls 13 are supported each by a transverse pin 14 pivotally movably forward or rearward and are arranged at a spacing longitudinally of the rail 10. The ratchet pawls 13 usually hang down under gravity and are at rest as projected downward beyond the lower surface of the rail 10. The pawls 13 in this state will not pivotally move even when a rearward force acts thereon but move forwardly upward when subjected to a forward force. No friction rail is provided beneath the auxiliary rail at the portion where the ratchet pawls 13 are provided. Instead of the friction rail, a wedgelike rail 15 is provided which extends from the rear end of the friction rail 11 at the first low-speed running portion 3t. At the front end, the thickness of the wedgelike rail 15 is equal to that of the friction rail 11 but gradually decreases rearward.

Figure 12:
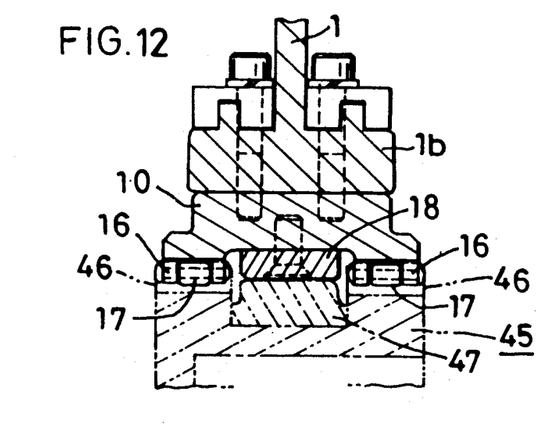
FIG. 12 is a view in section taken along the line XII-13 XII in FIG. 11.

With reference to FIGS. 11 and 12, the auxiliary rail 10 at the portion of transit from the first low-speed running portion 3t to the descent portion 6 is in the form of a roller rack portion 51. At opposite sides of the roller rack portion 51, a plurality of downward teeth 16 are formed which are arranged at a spacing longitudinally of the rack portion. Each tooth 16 has a transverse horizontal roller 17. A wedgelike rail 18 extending from the friction rail 11 is secured to the midportion lower surface of the auxiliary rail 10, in corresponding relation with the rollers 17. At the rear end, the thickness of the rail 18 is the same as that of the friction rail 11 but gradually decreases toward the front.

With reference to FIGS. 11 to 15, a rack 20 having downward teeth 19 is formed at opposite sides of the auxiliary rail 10 at the descent portion 6, integrally with the rail 10. The rear end of the rack 20 is continuous with the roller rack portion 51.

Figure 15:
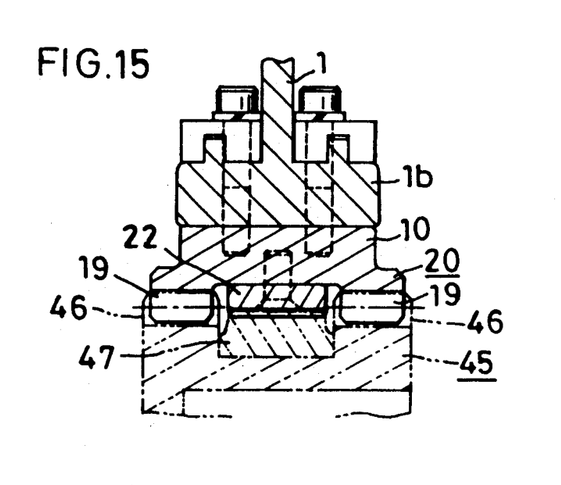
FIG. 15 is a view in section taken along the line XV—XV in FIG. 14.
Figure 16:
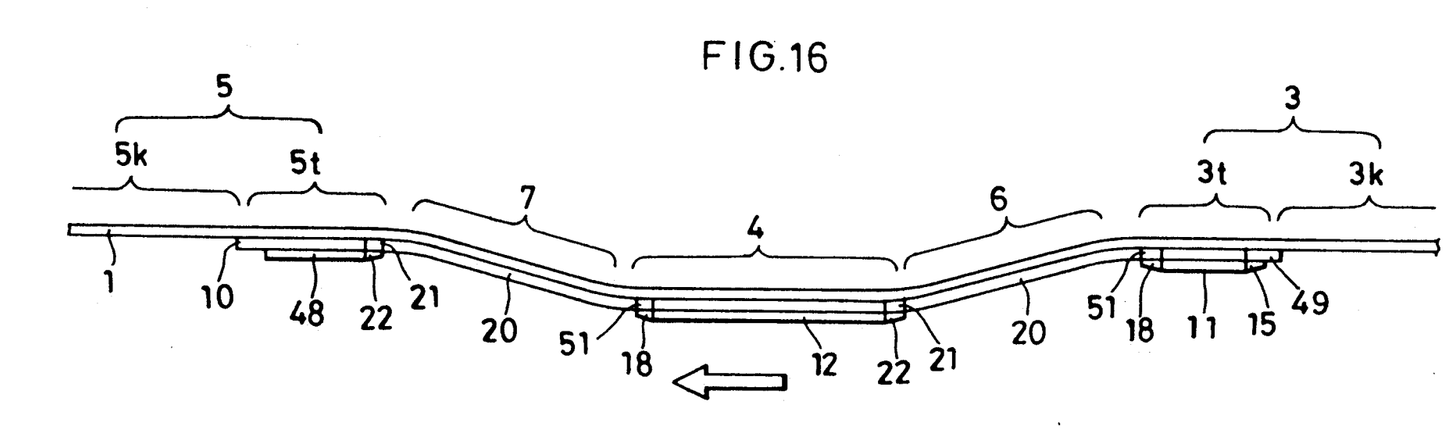
FIG. 16 is a fragmentary side elevation schematically showing the rail.

As seen in detail in FIGS. 14 and 15, a short rack 21 similar to and continuous with the rack 20 is formed at opposite sides of the auxiliary rail 10 at the portion of transit from the descent portion 6 to the low horizontal portion 4. A wedgelike rail 22 continuous with the rear end of the friction rail 12 at the low horizontal portion 4 is secured to the midportion lower surface of the auxiliary rail 10, in corresponding relation with the rack 21. The rail 22 is similar to the wedgelike rail 15.

The portion of transit from the low horizontal portion 4 to the ascent portion 7 is similar to the portion of transit from the first low-speed running portion 3t to the descent portion 6. The portion of transit from the ascent portion 7 to the second low-speed running portion 5t is similar to the portion of transit from the descent portion 6 to the low horizontal portion 4.

The carrier 2 has an intermediate first drive trolley 23, a front second drive trolley 24, a rear driven trolley 25, and hangers 26 provided between and suspended from the first drive trolley 23 and the driven trolley 25. The hangers 26 are each provided with a support frame 27 for placing thereon motor vehicle parts or like article A to be transported. The trolleys 23, 24, 25 comprise front frames 23a, 24a, 25a and rear frames 23b, 24b, 25b which are suspended from the running rail 1, and frames 23c, 24c, 25c interconnecting the lower portions of the front and rear frames, respectively. The first drive trolley 23 is connected to the second drive trolley 24 by a connecting member 28 in the form of a bar. A controller 29 for controlling the running of the carrier is attached to the connecting member 28. The carrier 2 can be flexed upward, downward, rightward or leftward at the joint portions of the hangers 26 and the connecting member 28.

With reference to FIGS. 4 and 5, each of the rear frame 23b of the first drive trolley 23, the front and rear frames 24a, 24b of the second drive trolley 24, and the front and rear frames 25a, 25b is provided at its upper portion with a vertical driven wheel 30 rollable on the upper surface of the upper flange 1a of the running rail 1, and with opposite upper wheels 31 disposed on opposite sides of the upper flange 1a for preventing horizontal deflection. Each of these frames is further provided at its lower portion with opposite lower wheels 32 arranged on opposite sides of the lower flange 1b of the rail 1 for preventing horizontal deflection.

As shown in detail in FIG. 3, the front frame 23a of the first drive trolley 23 is provided with a vertical first drive wheel 33 rollable on the upper surface of the upper flange 1a of the running rail 1 and has, like the above trolly frames, upper wheels 34 and lower wheels 35 for preventing horizontal deflection. A first electric motor 36 for high-speed running is attached as directed upward to one side of the front frame 23a and is coupled to the first drive wheel 33 by a clutch assembly 37, which although not shown, includes a clutch and a brake. The front frame 23a is provided with a current collector 38 opposed to the power distribution rail 9. The collector 38 has a plurality of collector members 39 arranged one above another and held in sliding contact with the respective electric wires 8 by suitable known means. Power and control signals are fed to the controller 29 from the electric wires 8 via the collector members 39.

Figure 6:
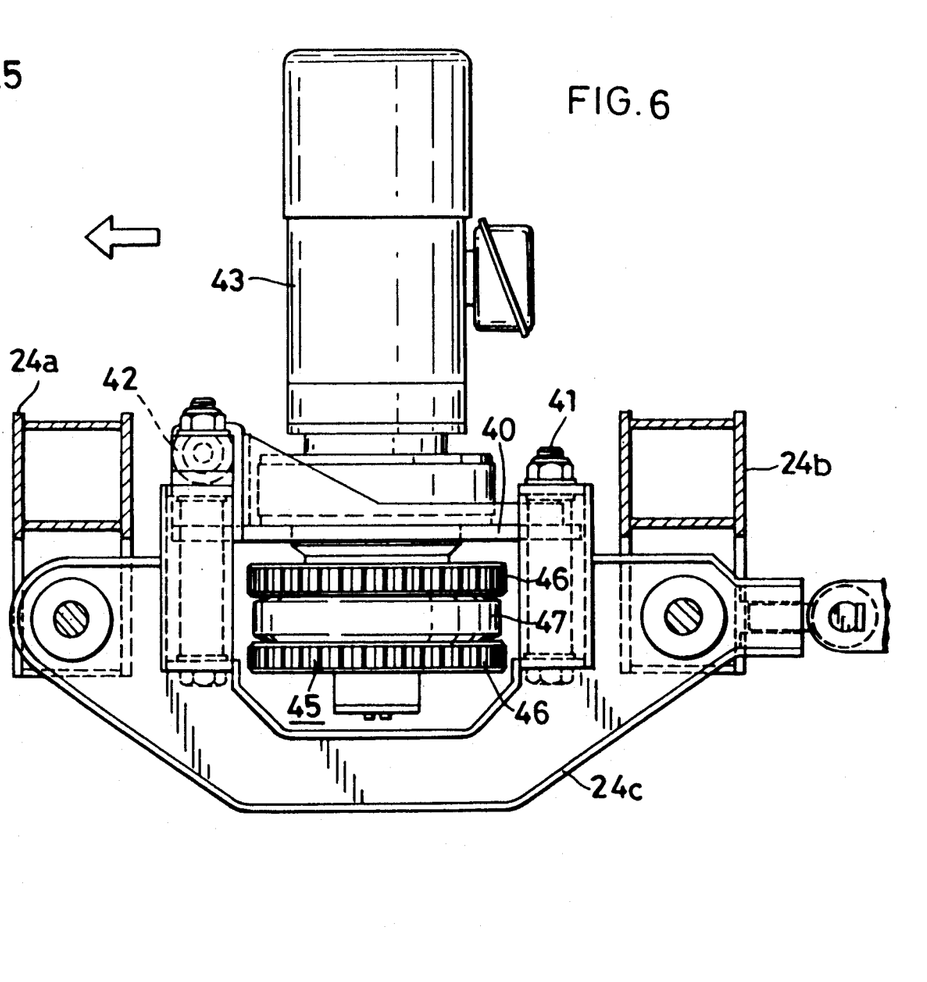
FIG. 6 is a view in section taken along the line VI—VI in FIG. 4.

With reference to FIGS. 4 to 6, a bracket 40 is attached to the connecting frame 24c of the second drive trolley 24. The bracket 40 is pivotally movable upward or downward within a given range about a transverse horizontal pin 41 and is biased upward by a spring 42. The bracket 40 has attached thereto a second electric motor 43 for running at a low speed and at the gradient portions. This motor 43 is disposed horizontally transversely of the running rail 1 and has a second drive wheel 45 secured to its motor shaft 44. The drive wheel 45 is integrally formed at its opposite sides with gears 46 having a larger diameter than the other portion of the wheel 45 and has fixed to the midportion of its outer surface a friction roller 47. The friction roller 47 is adapted to be pressed into contact with the lower surface of the friction rails 11, 12 by the spring 42. At the portions where the friction rails 11, 12 are absent, the friction roller 47 will not contact the auxiliary rail 10 even if the bracket 40 is pivotally moved to its upper limit position. Further wherever the bracket 40 is positioned, the gears 46 will not interfere with the friction rails 11, 12 but are meshable with the ratchet pawls 13, the rollers 17 and the teeth 19 of the racks 20, 21.

With the conveyor described above, the first drive wheel 33 causes the carrier 2 to run at a high speed at the first high-speed running portion 3k and the second high-speed running portion 5k. The second drive wheel 45 drives the carrier at a low speed at the first low-speed running portion 3t, descent portion 6, low horizontal portion 4, ascent portion 7 and second low-speed running portion 5t.

This will be described in order in detail.

At the first high-speed running portion 3k, the second motor 43 is at rest, and the first motor 36 is driven, with the clutch assembly 37 therefor engaged. Consequently, the first drive wheel 33 is driven, causing the carrier to run along the rail 1.

Figure 10:
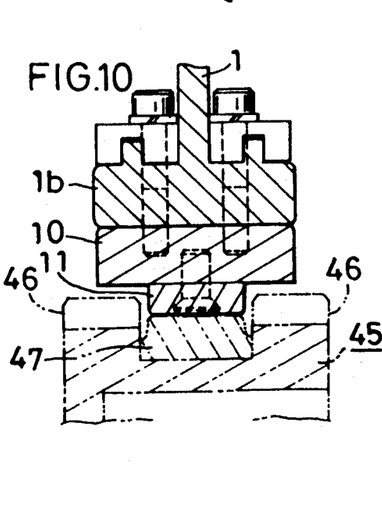
FIG. 10 is a view in section taken along the line X—X in FIG. 7.

When the carrier 2 in this state reaches the portion of transit to the first low-speed running portion 3t, the gears 46 of the second drive wheel 45 collide with ratchet pawls 13 as indicated in a phantom line S8 in FIG. 7 and as shown in FIG. 8. Upon the collision of the gears 46, these pawls 13 pivotally move forwardly upward and escape, but upon the passage of the colliding teeth of the gears 46, the pawls 13 hand down again under gravity. When the second drive wheel 45 reaches the portion of ratchet pawls 13, the first motor 36 stops, and the clutch assembly 37 is disengaged, rendering the first drive wheel 33 free. At the same time, the second motor 43 is brought into rotation. The second drive wheel 45 therefore rotates clockwise in FIG. 7, permitting the gears 46 to mesh with ratchet pawls 13, whereby the gears 46 are subjected to a forward force to thereby advance the carrier 2. When the carrier 2 has advanced to an extent, the friction roller 47 on the second drive wheel 45 comes into contact with the lower surface of an intermediate portion of the wedgelike rail 15 as indicated in a phantom line S9 in FIG. 7 and as shown in FIG. 9. The meshing engagement of the gears 46 with ratchet pawls 13 further advances the carrier 2, with the friction roller 47 in contact with the wedgelike rail 15. Eventually, the friction roller 47 leaves the rail 15 and comes into contact with the friction rail 11, while the gears 46 leave the ratchet pawls 13 as indicated in a phantom line S10 in FIG. 7 and as shown in FIG. 10. The carrier 2 runs along the running rail 1 at the low speed in this state by virtue of the rotation of the friction roller 47.

In the above mode of running, the ratchet pawls 13 provided serve to mitigate the impact resulting from the collision of the gears 46, while the meshing engagement of the gears 46 with the ratchet pawls 13 advances the second drive wheel 45 to properly bring the friction roller 47 into contact with the friction rail 11. Since the friction roller 47 is driven by the low-speed running second motor 43, there is no likelihood of the drive torque becoming insufficient.

Figure 13:
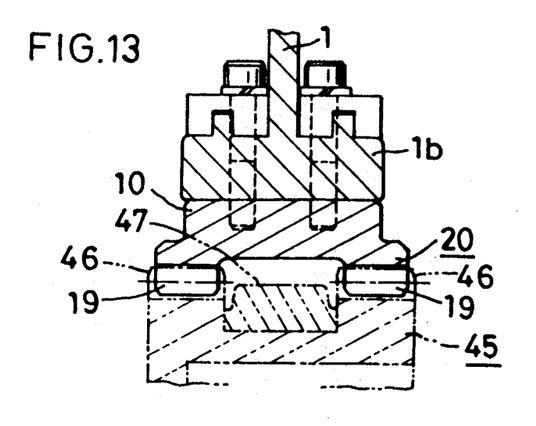
FIG. 13 is a view in section taken along the line XIII-13 XIII in FIG. 11.

Upon the carrier 2 reaching the portion of transit to the descent portion 6 after running along the first low-speed running portion 3t, the friction roller 47 on the second drive wheel 45 moves from the friction rail 11 to the wedgelike rail 18, and the gears 46 meshes with the rollers 17 of the roller rack portion 51 to thereby advance the carrier 2 as indicated in a phantom line S12 in FIG. 11 and as shown in FIG. 12. When the carrier 2 has advanced to an extent, the friction roller 47 leaves the wedgelike rail 18, and in the meantime, the gears 46 come into meshing engagement with the rack 20 after leaving the rollers 17. The engagement of the gears 46 with the rack 20 causes the carrier 2 to run at a low speed along the running rail 1 at the descent portion 6 as indicated in a phantom line S13 in FIG. 11 and as shown in FIG. 13.

In the above process, the rollers 17 provided upstream from the rock 20 permit the gears 46 to mesh with the rack 20 smoothly. Further since the meshing engagement of the gears with the rack 20 drives the carrier 2 along the descent portion 6, the carrier 2 is unlikely to slip. The gears 46 mesh with the downward teeth 19 of the rack 20, while the first drive wheel 33 and the driven wheels 30 bear the weight of the carrier 2. This assures smooth engagement between the gears 46 and the rack 20 and diminishes the wear that would occur.

Upon the carrier 2 reaching the portion of transit to the low horizontal portion 4 after running along the descent portion 6, the friction roller 47 comes into contact with the wedgelike rail 22, and the gears 46 mesh with the rack 21 as indicated in a phantom line S15 in FIG. 14 and as seen in FIG. 15. This enables the friction roller 47 to leave the rail 22 and come into contact with the friction rail 12 properly. As is the case with the first low-speed running portion 3t, the friction roller 47 causes the carrier 2 to run at a low speed.

The carrier travels along the portion of transit from the low horizontal portion 4 to the ascent portion 7 in the same manner as already described with reference to FIGS. 11 to 13.

At this time, the meshing engagement of the gears 46 with the rack 20 causes the carrier 2 to run along the ascent portion 7. This prevents the carrier 2 from slipping.

The carrier travels along the portion of transit from the ascent portion 7 to the second low-speed running portion 5t in the same manner as already described with reference to FIGS. 14 and 15.

Upon the carrier 2 reaching the portion of transit to the second high-speed running portion 5k after running along the second low-speed running portion 5t, there is no friction rail 48 for the roller 47 to roll on, and the second motor 43 stops. At the same time, the first motor 36 is driven, and the clutch assembly 37 is engaged. The first drive wheel 33 therefore rotates, causing the carrier 2 to run along the second high-speed running portion 5k.

Although the carrier 2 ia adapted to run at a low speed along the entire low horizontal portion 4 according to the embodiment described, this portion 4 may be divided into a low-speed running portion at opposite ends and an intermediate high-speed running portion.

What is claimed is:

1. A conveyor comprising a plurality of self-propelled carriers adapted to run along a rail, the rail having horizontal portions and a gradient portion therebetween, at least one horizontal portion having a high-speed running portion wherein the carrier is adapted to run at a high speed and a low-speed running portion wherein the carrier is adapted to run at a low speed, a first drive bearing surface facing upward provided at the rail, a rack having a plurality of teeth facing downward provided at the gradient portion of the rail, and a friction roller bearing surface facing downward provided at the low-speed running portion;

each carrier having a first electric motor, a first drive wheel driven by the first electric motor and rolling on the first drive bearing surface, a second electric motor, a gear driven by the second electric motor for engagement with the teeth of the rack of the rail, and a friction roller driven by the second electric motor together with the gear for pressing contact with the friction roller bearing surface of the rail;

the first drive wheel driven by the first electric motor and rolling on the first drive bearing surface driving the carrier at a high speed at the high-speed running portion of the rail, the friction roller driven by the second electric motor and in pressing contact with the friction roller bearing surface driving the carrier at a low speed at the low-speed running portion of the rail, and the gear driven by the second electric motor and engaged with the teeth of the rack driving the carrier at a low speed at the gradient portion of the rail.

* * * * *